Dec. 25, 1951    R. G. LOVE    2,580,109
TRACTOR HITCH
Filed Jan. 3, 1950
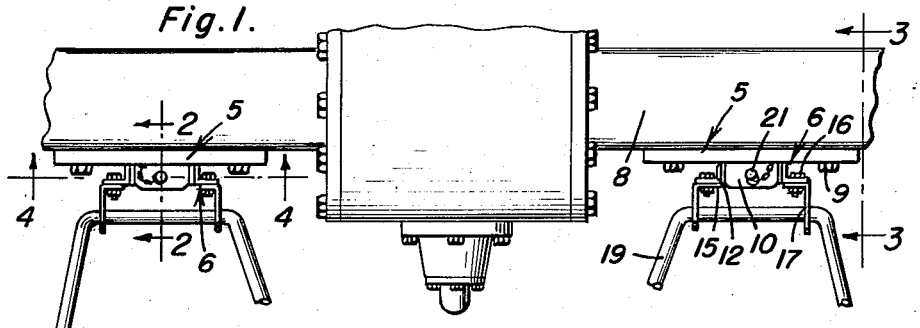
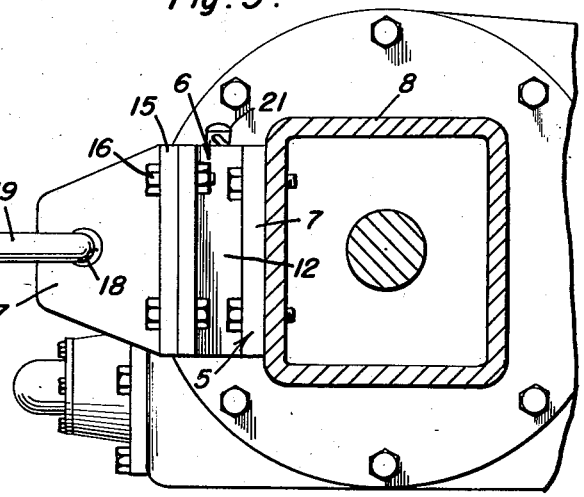
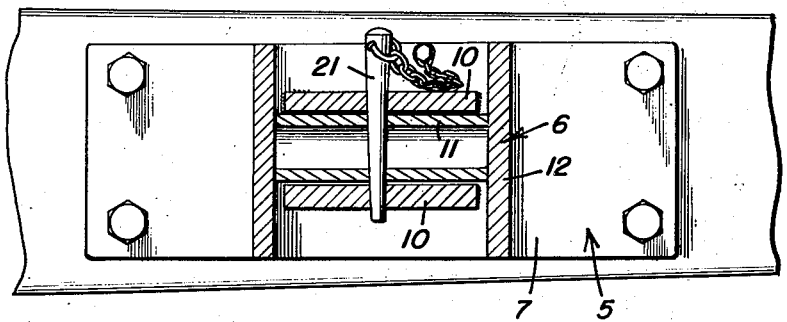
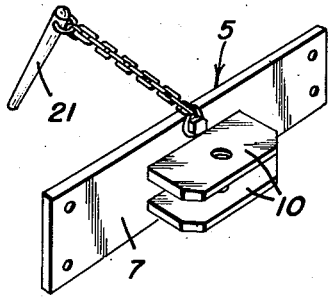
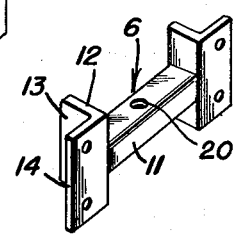
Raymond G. Love
INVENTOR.

Patented Dec. 25, 1951

2,580,109

UNITED STATES PATENT OFFICE 2,580,109

TRACTOR HITCH

Raymond G. Love, Byron, Mich.

Application January 3, 1950, Serial No. 136,527

1 Claim. (Cl. 280—33.15)

The present invention relates to new and useful improvements in tractor hitches for easily and quickly attaching various farm implements to a tractor.

An important object of the invention is to provide a tractor attached hitch bracket and an implement attached hitch bracket fitted one within the other and a coupling pin holding the brackets in connected relation with each other.

Another object is to provide transversely elongated interfitted tractor and implement brackets whereby the implement bracket is held from twisting or swinging relative to the tractor bracket.

A further object is to provide a hitch of this character of simple and practical construction, which is strong and durable, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the hitch attached to a tractor;

Figures 2, 3 and 4 are enlarged sectional views taken respectively on line 2—2, 3—3 and 4—4 of Figure 1;

Figure 5 is a perspective view of the tractor bracket; and,

Figure 6 is a similar view of the implement bracket.

Referring now to the drawing in detail, wherein for the purpose of illustration I have disclosed a preferred embodiment of my invention, the numeral 5 designates generally a tractor attached bracket while 6 designates an implement attached bracket.

Bracket 5 comprises an attaching plate 7 secured to a rear axle housing 8 of a tractor by studs 9, the plate having a pair of horizontally vertically spaced apart apertured ears 10 projecting rearwardly therefrom. A pair of brackets 5 are secured to the axle housing adjacent the ends thereof.

The implement attached bracket 6 comprises a hollow bar 11 of square shape in cross section with angle-iron attaching plates 12, welded at one flange 13 to the ends of the bar in a vertical position and with the other flange 14 of the plates 12 provided with openings for attaching angle iron plates 15 thereto by bolts and nuts 16. The bar 11 is provided with a central opening 20.

Flanges 17 project rearwardly from the pair of plates 15 and have alined openings 18 for rockably supporting a tool or implement bar 19.

In coupling the tool bars 19 to the tractor, the tractor bracket 5 is bolted to axle housing 8 and hollow bar 11 is placed between apertured ears 10 and a tapered coupling pin 21 inserted in the alined openings of the ears and opening 20 of bar 11 to hold the brackets 5 and 6 in coupled engagement.

The angle plates 15 attached to the tool bars 19 are then bolted to the flanges 14 of angle plates 12 at the ends of bar 11.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A tractor hitch comprising in combination a tractor attached bracket and an implement attached bracket, said first named bracket including an attaching plate having horizontally positioned upper and lower spaced apart apertured ears projecting rearwardly therefrom, and said second named bracket including a hollow elongated square shaped member positioned horizontally between said ears and having an opening transversely thereof alined with the apertures of the ears, a coupling pin inserted in said alined openings, a plate fixed to each end of the hollow member, and vertically positioned rearwardly projecting apertured ears carried by said last named plates pivotally receiving an implement tool bar.

RAYMOND G. LOVE.

REFERENCES CITED

The following references are of record in the file of this patent:

UNITED STATES PATENTS

| Number | Name | Date |
|---|---|---|
| 1,923,367 | Gifford et al. | Aug. 22, 1933 |